United States Patent [19]

Yamagishi et al.

[11] Patent Number: 5,478,107
[45] Date of Patent: Dec. 26, 1995

[54] AIR BAG DOOR SYSTEM AND METHOD FOR MANUFACTURING THE SAME

[75] Inventors: Koichi Yamagishi; Kazuyasu Maeda; Yasuhiro Nakai, all of Aichi, Japan

[73] Assignee: Inoac Corporation, Nagoya, Japan

[21] Appl. No.: 351,531

[22] Filed: Dec. 7, 1994

[30] Foreign Application Priority Data

Dec. 7, 1993 [JP] Japan ................... 5-340588

[51] Int. Cl.$^6$ .................................... B60R 21/22
[52] U.S. Cl. ........................ 280/728.3; 280/732
[58] Field of Search ............... 280/728 B, 732, 280/752, 728 A, 730 R, 728 R, 728.3, 728.2, 730.1, 728.1

[56] References Cited

U.S. PATENT DOCUMENTS

| | | | |
|---|---|---|---|
| 3,756,617 | 9/1973 | Brown | 280/732 |
| 3,966,227 | 6/1976 | Cameron | 280/752 |
| 4,893,833 | 1/1990 | DiSalvo et al. | 280/728 B |
| 4,964,653 | 10/1990 | Parker | 280/728 B |
| 5,072,967 | 12/1991 | Batchelder et al. | 280/732 |
| 5,096,221 | 3/1992 | Combs et al. | 280/728 B |
| 5,219,177 | 6/1993 | Wang | 280/728 B |
| 5,320,381 | 6/1994 | Barnes et al. | 280/728 B |
| 5,394,602 | 3/1995 | Czapp et al. | 280/752 |
| 5,395,668 | 3/1995 | Ho et al. | 280/728 B |
| 5,398,959 | 3/1995 | Avila | 280/728 B |
| 5,421,608 | 6/1995 | Parker et al. | 280/728.3 |
| 5,433,474 | 7/1995 | Farrington et al. | 280/732 |

FOREIGN PATENT DOCUMENTS

| | | | |
|---|---|---|---|
| 0141937 | 8/1983 | Japan | 280/752 |
| 5042857 | 2/1993 | Japan | 280/732 |

Primary Examiner—Margaret A. Focarino
Assistant Examiner—Peter C. English
Attorney, Agent, or Firm—Sughrue, Mion, Zinn, Macpeak & Seas

[57] ABSTRACT

An air bag door system including an air bag door portion releasably connected with a car inside member along the contact lines thereof, the air bag door portion being covered with one cover member and the car inside member being covered with another cover member. The cover members of the air bag door portion and the car inside member respectively include flange portions which are bent toward the respective back sides of the two cover members. Also, the two cover members are so connected with each other as to form the contact line through engaging portions respectively formed in the flange portions. Further, on the back surfaces side of the two cover members including the flange portions, there is provided a common resin layer which is formed integrally with the respective back surfaces of the two cover members.

10 Claims, 6 Drawing Sheets

AIR BAG DOOR SYSTEM AND METHOD FOR MANUFACTURING THE SAME

BACKGROUND OF THE INVENTION

1. Field of the Invention

The present invention relates to an air bag door system and a method for manufacturing the same.

2. Description of the Related Art

In recent years, to protect car passengers safely against shocks given in a car accident, as shown in FIGS. 13 and 14, for example, in a front passenger seat, there is disposed an air bag device 100 within a car inside member (an instrument panel) P provided in the front portion of the car. In a given position of the instrument panel P, there is formed a developing opening 102 for an air bag 101. The opening 102 is normally covered with an air bag door 110 as shown in FIG. 14.

When the car is given a great shock due to a collision or the like, then an operation portion 103 of the air bag device 100 shown in FIG. 14 is operated to expand the air bag 101 stored in an air bag storage portion 104. The expansion of the air bag 101 pushes to open the air bag door 110 so that the air bag 101 can be developed into a car room.

According to the structure of the conventional air bag door, as can be understood well from FIG. 14, the air bag door 110, which is formed separately from a car inside member such as the instrument panel P, is normally fitted into and mounted to the air bag developing opening 102 that is formed in the car inside member P.

In FIG. 14, reference character 111 designates a cover member for the air bag door 110; 112, a base resin layer; 113, a core member; and 119, a hinge portion. Also, in connection with the instrument panel P which is a car inside member, reference character P1 designates an instrument panel cover member; P2, a base resin layer of the instrument panel P; and P3, an instrument panel core member.

As described above, in the conventional air bag door structure of this type, the air bag door structure must be formed separately from the car inside member such as the instrument panel. As a matter of course, there is necessary an operation process for fitting and mounting the air bag door to the air bag developing opening formed in the car inside member. These operations require costs which are not low at all.

Also, the air bag door mounting operation itself is troublesome. Moreover, when the separately formed air bag door is mounted to the air bag developing opening, there are inevitably produced level differences and gaps between the air bag door and air bag developing opening. Not only this is unfavorable for the appearance of the product but also lines produced by such level differences and gaps can reflect on the windshield or the like to disturb the field of vision of a driver.

SUMMARY OF THE INVENTION

The present invention aims at solving the above described problems. Accordingly, it is an object of the invention to provide an air bag door system capable of solving the economical, production-step-wise, and product disadvantages that are caused when the air bag door is formed separately.

In attaining the above object, the invention provides an air bag door system including a first cover member constituting a car inside member, a second cover member constituting an air bag door portion releasably connected with the car inside member along a contact line thereof, and a common resin layer formed integrally on the back surface side of the first and second cover members, wherein the first and second cover members include flange portions respectively bent toward the respective back sides of the cover members and are connected releasably with each other through engaging portions respectively formed in the flange portions.

BRIEF DESCRIPTION OF THE DRAWINGS

The accompanying drawings, which are incorporated in and constitute a part of this specification, illustrate embodiments of the invention and, together with the description, serve to explain the objects, advantages and principles of the invention. In the drawings.

DETAILED DESCRIPTION OF THE PREFERRED EMBODIMENTS

Now, description will be given below in detail of the invention with reference to the accompanying drawings.

Figure 1:
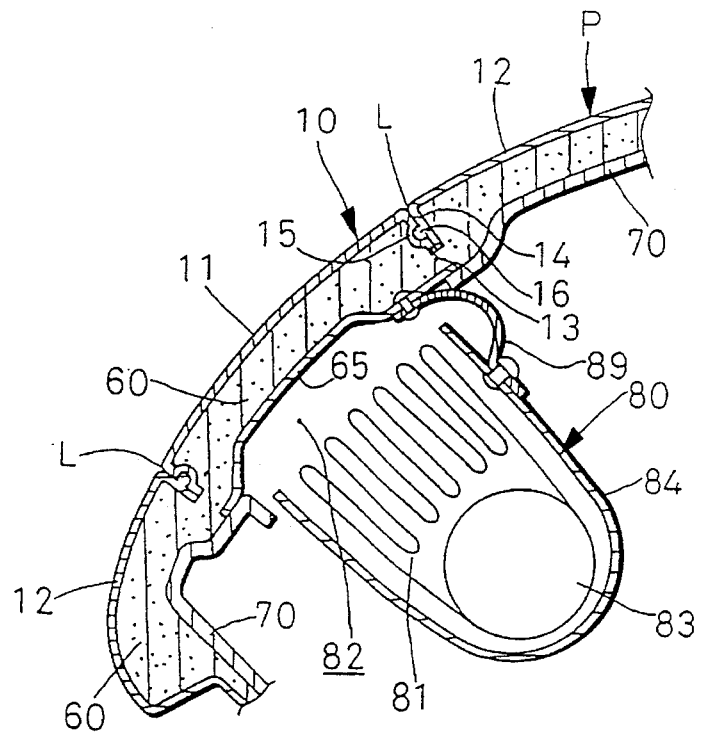
FIG. 1 is a sectional view of the main portions of an embodiment of an air bag door system according to the invention.

The present invention, as shown in FIG. 1, relates to an air bag door system, in which an air bag door portion 10 covered with a cover member 11 is formed integrally with a car inside member such as an instrument panel P covered with a cover member 12 along the contact lines L thereof.

The term "car inside member" used here is a generic name for the instrument panel P to be described in the following embodiments of the invention, a panel member disposed in the portion of the car room side to which an air bag door system is to be mounted, and other members.

As shown in FIG. 1, the cover member 11 in the air bag door portion 10 and the cover member 12 in the car inside member P respectively include flange portions 13 and 14 which are bent toward the back sides of the respective cover members along the contact lines L thereof.

The flange portions 13 and 14 respectively include engaging portions. For example, the flange portion 13 includes a recessed groove portion 15 and the flange portion 14 includes a projection portion 16, while these groove and projection portions are connected with each other in such a manner as to form a given contact line L.

Also, on the back surface sides of the respective cover members 11 and 12 that include the flange portions 13 and 14, there is formed integrally therewith a common resin layer, such as a polyurethane foam layer 60.

On the back surface side of the polyurethane foam layer 60, there is formed integrally therewith a core member which is normally formed of a hard material. In the embodiment shown in FIG. 1, on the back surface side of the air bag door portion 10, there is disposed a core member 65, a reinforcing substrate of the air bag door portion, which is formed independently of a core member 70, a reinforcing substrate of the car inside member.

In FIG. 1, reference character 80 designates an air bag device which is mounted on the back surface side of the air bag door portion 10; 81, an air bag; 82, a developing opening for the air bag 81; 83, an air bag operation portion; 84, a storage container for storing the air bag 81; and 89, a hinge portion for connecting the air bag storage container 84 with the air bag door portion core member 65.

Figure 2:
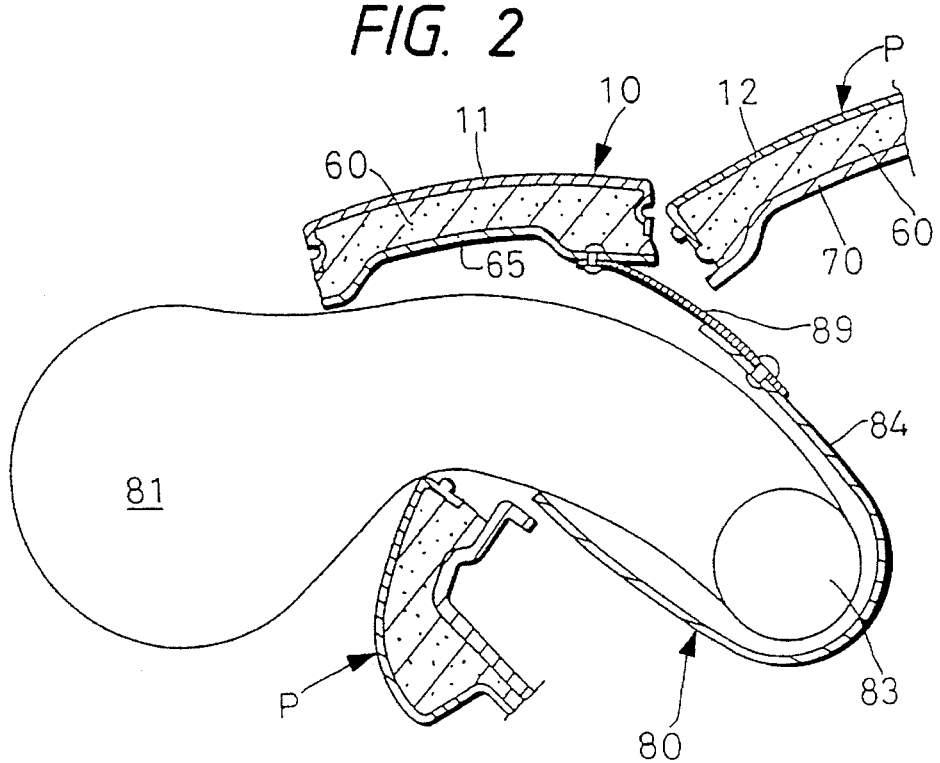
FIG. 2 is a sectional view of the above air bag door system, showing a state in which an air bag is expanded.

FIG. 2 is a sectional view of the air bag door system shown in FIG. 1, in which the air bag 81 is expanded and the air bag door portion 10 is thereby opened. As shown in FIG. 2, when the air bag 81 is expanded with the operation of the air bag device 80, then the air bag door portion 10 is pushed open due to the expansion pressure of the air bag 81 from the car inside member P (instrument panel) together with the core member 65 of the air bag door portion through an opening defined by the contact lines L of the car inside member P, so that the air bag 81 can be developed into a car room.

In addition, the recessed groove portion 15 may be included in the flange portion 14, and the projection portion 16 may be included in the flange portion 13.

Figure 3:
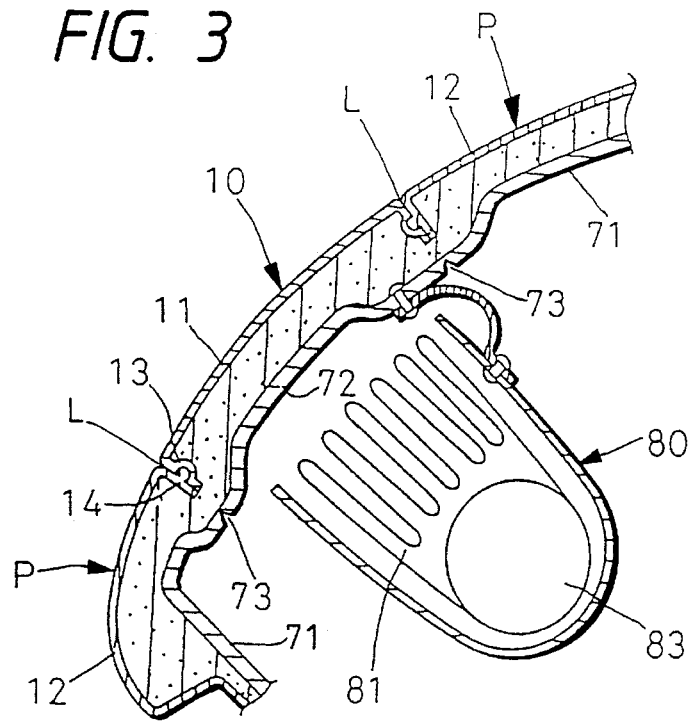
FIG. 3 is a sectional view of the main portions of another embodiment of an air bag door system according to the invention.

Now, FIG. 3 is a sectional view of the main portions of another embodiment of an air bag door system according to the invention, in which, on the back surface side of the air bag door portion 10, there is formed a core member 72 for the air bag door portion in common with a core member 71 of the car inside member. In the present embodiment, in the boundary portions to separate the core member 71 from the core member 72, there are formed breaking or frangible portions such as V-shaped groove notch portions 73 corresponding to the contact line L of the cover members 11 and 12 as shown in FIG. 3, reduced thickness portions (not shown), or slit grooves (not shown), which is used to regulate the opening shape of the air bag door portion 10. When the air bag 81 is expanded, then the frangible portions such as the V-shaped groove notch portions 73 are broken and the air bag door portion 10 is thereby pushed open together with the core member 72 from the car inside member through the opening defined by the contact lines L of the instrument panel P, so that the air bag 81 can be developed into a car room.

Next, description will be given below in detail of not only a method of manufacturing an air bag door system according to the invention but also the structure of the respective parts of the system.

Figure 4:
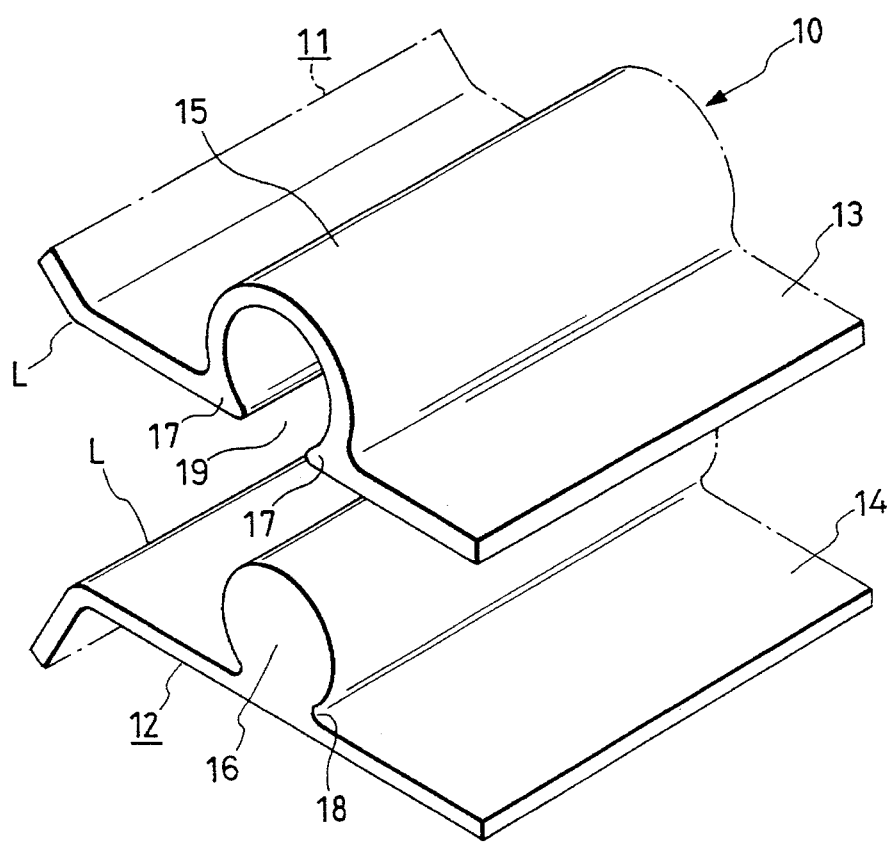
FIG. 4 is a partially perspective view of flange portions of cover members used in the invention.

In FIG. 4, there is shown an enlarged perspective view of the main portions of the cover members 11 and 12 which are respectively used in the embodiments shown in FIGS. 1 and 3. The cover members 11 and 12 are formed of flexible polyvinyl chloride or the like and are formed in respectively independent given shapes by a known slush molding or the like.

As the cover members 11 and 12, a member of the same type can be used. However, as demands arise, the cover member of the air bag door portion may be formed in a higher quality or may be formed thicker than the cover member of the car inside member.

As described above, the cover members 11 and 12 respectively include the flange portions 13 and 14, the end portions of which are bent toward the back surfaces of the respective cover members along the contact line L for separating the air bag door portion from the car inside member.

Further, in the flange portion (in this embodiment, 13) of one cover member, there is formed a recessed groove portion 15 on the surface thereof which is overlapped on the flange portion 14 of the other cover member. The recessed groove portion 15 can be engaged with a projection portion 16 (which will be described below) to thereby connect the cover members 11 and 12 with each other superimposingly. In addition, preferably, the recessed groove portion 15 may be disposed in parallel to and along the contact line L.

Figure 5:
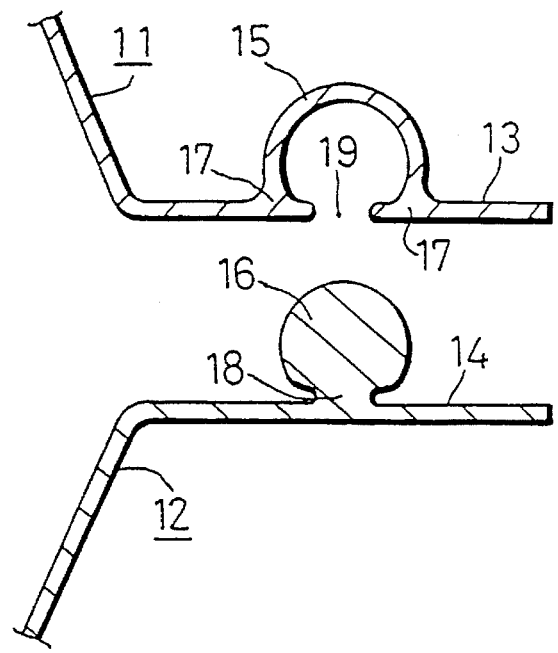
FIG. 5 is a sectional view of the above flange portions.

As can be understood from FIG. 5 as well, the recessed groove portion 15 includes increased thickness portions 17 in the opening 19 thereof and thus the opening 19 is formed narrower in width than the interior of the groove. The increased thickness portions 17 can give rigidity to the opening 19 of the recessed groove portion 15 and can assure the engagement with the projection portion 16, thereby being able to keep a given superimposed condition between the two flange portions in a stable manner.

On the other hand, in the flange portion 14 of the other cover member 12, there is formed, along the contact line L, the projection portion 16 which can be fitted into the recessed groove portion 15 to keep the superimposed condition of the flange portions.

The projection portion 16 includes a root portion 18 which is formed narrower in width than the remaining portions of the projection portion 16. When the projection portion 16 is fitted into the recessed groove portion 15, the root portion 18 can be securely engaged with and held by the increased thickness portion 17, thereby preventing the projection portion 16 from slipping off from the recessed groove portion 15 easily.

Thus, when the flange portions 13 and 14 are superimposed on each other and the recessed groove portion 15 and projection portion 16 are engaged with each other, then the cover members 11 and 12 can be connected with each other while forming a given contact line L.

In addition, the shapes of the recessed groove portion 15 and projection portion 16 can be selected properly according to the thicknesses and rigidities of cover members to be connected.

Also, the recessed groove portion 15 and projection portion 16 can be formed simultaneously and integrally with the cover members by applying given molding shapes to the flange portion forming portion of a mold which is used to mold the cover members.

Figure 6:
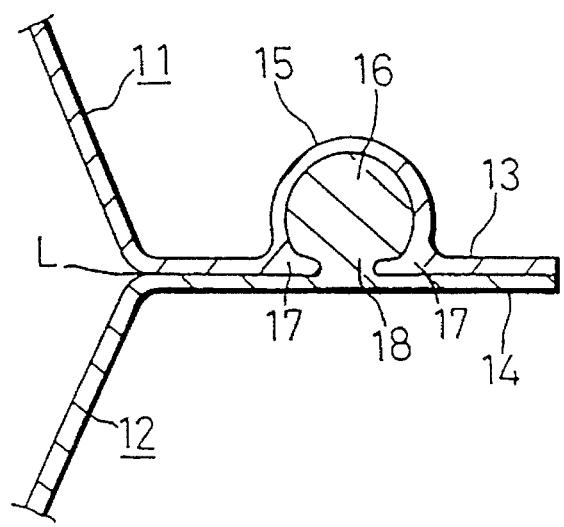
FIG. 6 is a sectional view of the above flange portions, showing a state in which the flange portions are connected with each other.

As shown in FIG. 6, the two independent cover members 11 and 12 are connected with each other such that a given contact line L can be formed, by fitting the recessed groove portion 15 and projection portion 16 with each other, which are respectively formed in the flange portions 13 and 14 thereof and serve as the engaging portions thereof.

Figure 7:
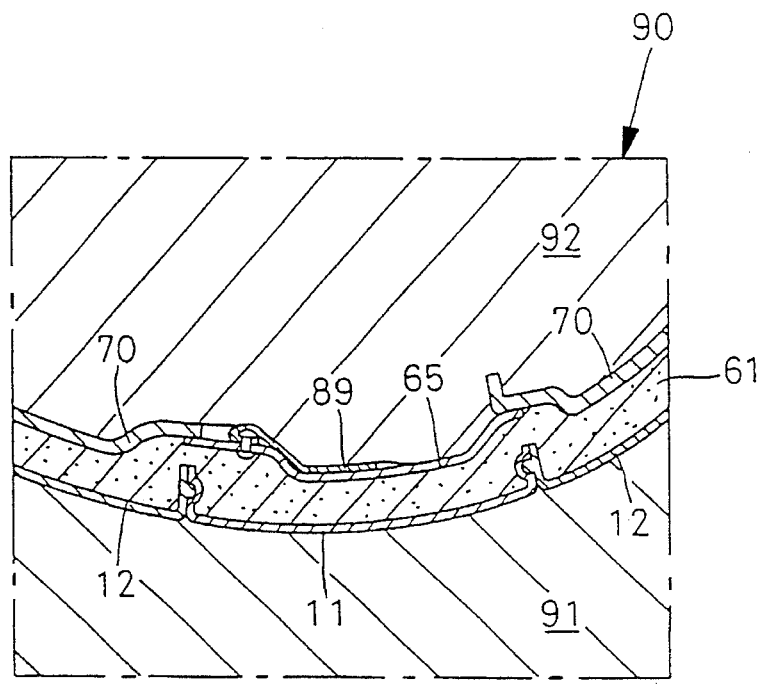
FIG. 7 is a sectional view of the main portions of a mold, showing an embodiment of a method for manufacturing an air bag door system according to the invention.

As shown in FIG. 7, in one mold half 91 of a forming mold 90 which has the same cavity as the product, there are set the two cover members 11 and 12, which are connected with each other previously or on the cavity surface of the mold half 91, while, on the cavity surface of the mold half 92, there are set necessary core members, here, the core member 65 for the air bag door portion and the core member 70 for the car inside member. After reactive foaming ingredients 61 such as polyurethane foam or the like are introduced onto the back surface sides of the cover members 11 and 12, the two mold halves are closed, allowing the foaming reaction to take place in the cavity. In this condition, the two cover members 11 and 12 are formed into an integral molding while the flange portions 13 and 14 thereof are being embedded.

Reference character 89 in FIG. 7 designates a hinge portion which is provided in the core member 65.

Figure 8:
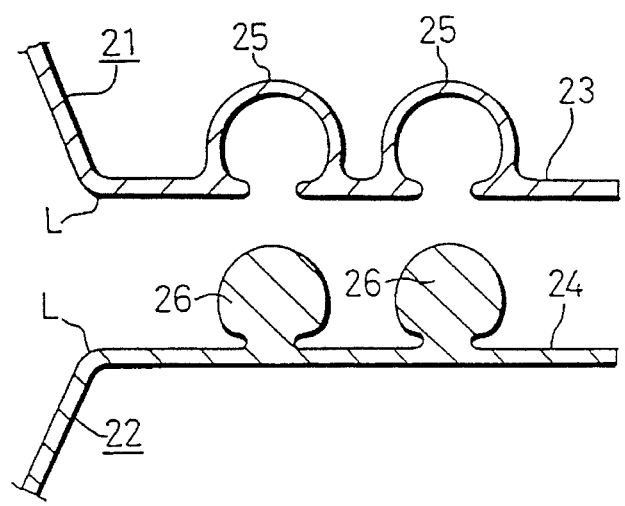
FIG. 8 is a sectional view of an example of engaging portions respectively formed in the flange portions of cover members used in the invention.

Now, FIG. 8 shows another example of the engaging portions of the cover members used in the present invention. Reference characters 21 and 22 designate cover members, and 23 and 24 designate flange portions thereof, respectively.

In this example, in the flange portion 23 of the cover member 21, there are formed two recessed groove portions 25, 25 along a given contact line L and, in the flange portion 24 of the cover member 22, there are formed two projection portions 26, 26 which are fitted into the recessed groove portions 25, 25, respectively. According to this structure, the flange portions 23 and 24 can be connected with each other more securely.

In addition, the recessed groove portions 25, 25 may be formed in the flange portion 24, and the projection portions 26, 26 may be formed in the flange portion 23.

Figure 9:
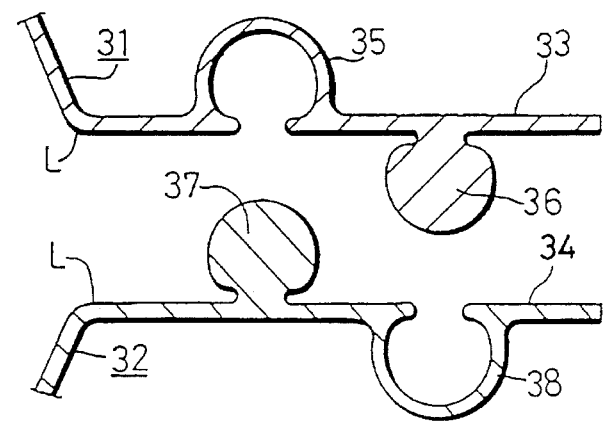
FIG. 9 is a sectional view of another example of the above engaging portions.

Also, in FIG. 9, in a flange portion 33 of a cover member 31, there are formed a recessed groove portion 35 and a projection portion 36 along a given contact line L. Further, in a flange portion 34 of a cover member 32, there are formed a projection portion 37 and a recessed groove portion 38 which correspond to the recessed groove portion 35 and projection portion 36, respectively.

Figure 10:
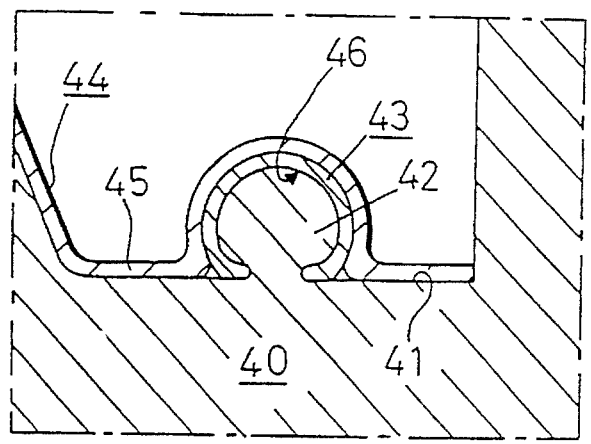
FIG. 10 is a sectional view of an example in which a recessed groove portion in the flange portion of the cover member is formed of an insert material.
Figure 11:
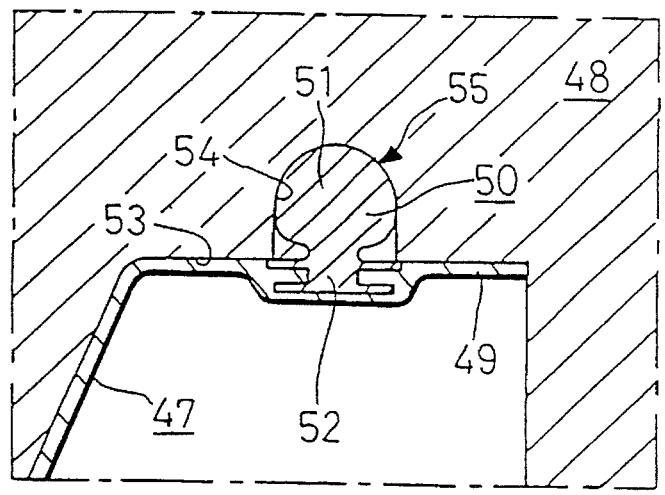
FIG. 11 is a sectional view of another example in which a projection portion in the above flange portion is formed of an insert material.
Figure 12:
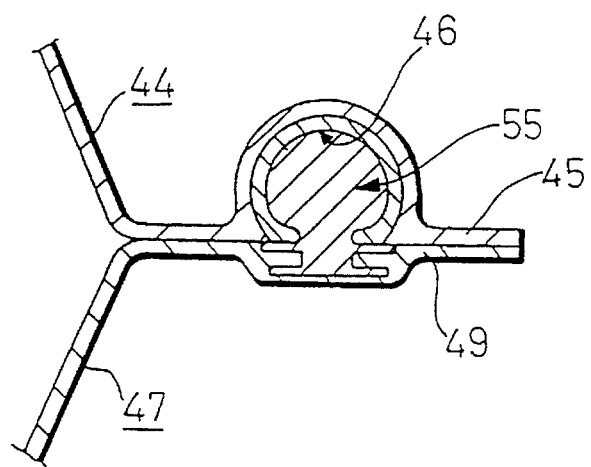
FIG. 12 is a sectional view of the cover members obtained according to FIGS. 10 and 11, showing a state in which the cover members are connected with each other.
Figure 13:
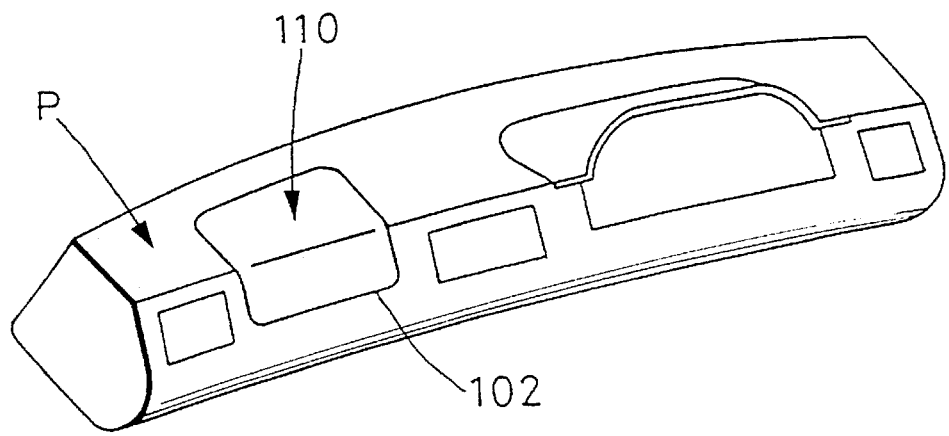
FIG. 13 is a schematic perspective view of an instrument panel, showing a conventional air bag door system.
Figure 14:
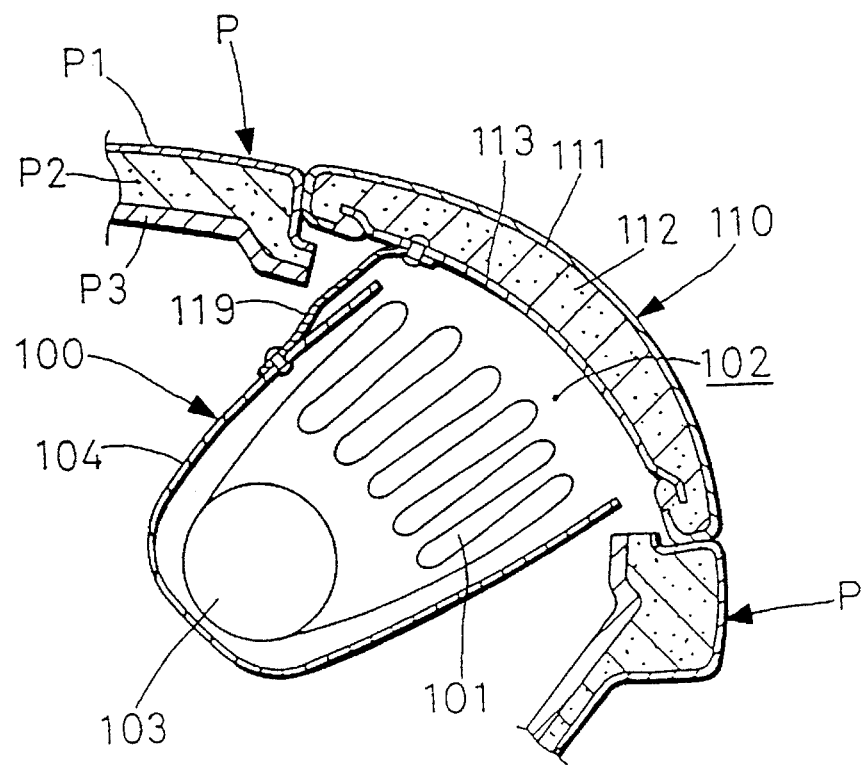
FIG. 14 is a sectional view of the conventional air bag door system.

Furthermore, in FIGS. 10 to 12, there are shown examples in which a recessed groove portion and a projection portion are respectively formed by use of an insert member.

That is, as shown in FIG. 10, a projection 42 is provided in a flange portion forming portion 41 of a cover member forming mold 40, and an insert member 43 having a recessed groove shape is set at the projection 42. The insert member 43 is formed into a given shape having a proper rigidity by an injection molding method, an extrusion molding method or the like. When a resin material for forming a cover member 44 is introduced into the forming mold 40, then there can be produced the cover member 44 including in a flange portion 45 thereof a recessed groove portion 46 which is formed of the insert member 43.

Similarly, as shown in FIG. 11, an insert member 50 for forming a projection portion is set in a cover member forming mold 48 which is used to form a cover member 47. The insert member 50 includes a projection portion 51 so formed as to have a shape engageable with the insert member 43 having a recessed groove shape, and a base portion 52. When the projection portion 51 is set into an insert groove 54 formed in a flange portion forming portion 53 of the forming mold, then a flange portion 49 is formed integrally.

In the flange portion 49 of the cover member 47 formed integrally in this manner, the projection portion 51 of the insert member 50 projects while the base portion 52 of the insert member 50 is embedded in the cover member 47 integrally therewith, and the projection portion 51 provides a projection portion 55 of the cover member 47.

Finally, as shown in FIG. 12, when the projection portion 55 is engaged with the recessed groove portion 46 formed by the respective insert members, then the two flange portions 45 and 49 are superimposed on and connected with each other, so that the cover members 44 and 47 can be connected with each other.

Such formation of the engaging portions by use of the insert members is effective when the engaging portions provided by the cover members themselves are short of rigidity, or when it is difficult to form engaging portions in the flange portions of the cover members by use of the cover members themselves.

Alternatively, an engaging portion may be formed only in one of the cover members by use of an insert member and an engaging portion may be formed in the other cover member by use of the cover member itself.

As has been illustrated and described heretofore, according to the invention, when the air bag door is formed in the air bag developing opening of the car inside member, there can be completely eliminated the need to form an air bag door structure separately from the car inside member such as an instrument panel as in the conventional system. At the same time, as a matter of course, there can be avoided an operation to fit and mount a separately formed air bag door onto the air bag developing opening of the car inside member. Due to this, the invention is greatly advantageous in economy and production steps over the conventional system.

Also, in the conventional system, when the air bag door is mounted to the air bag developing opening of the car inside member by a troublesome operation, there have been inevitably produced level differences or gaps in the boundary area between them. On the other hand, according to the invention, there is no possibility at all that such level differences or gaps can be produced. Therefore, the invention not only can improve the appearance of the product to a great extent but also can provide a passenger with more comfort and safety to thereby be able to realize safe driving.

What is claimed is:

1. An air bag door system comprising:

a first cover member constituting a car inside member and having front and back surfaces;

a second cover member constituting an air bag door portion releasably connected with the car inside member along a contact line thereof and having front and back surfaces; and a common foam layer formed integrally on the respective back surfaces of said first and second cover members, wherein said first and second cover members include flange portions respectively bent toward the respective back surfaces of said first and second cover members and are releasably connected with each other through engaging portions respectively formed in the flange portions.

2. The air bag door system according to claim 1, wherein the air bag door portion includes a back surface, and wherein a core member for the air bag door portion formed independently of the car inside member is provided integrally on the back surface of the air bag door portion.

3. The air bag door system according to claim 1, wherein the air bag door portion includes a back surface, and wherein a core member, which also forms a portion of the car inside member, is provided integrally on the back surface of the air bag door portion, said core member including a frangible portion for regulating an opening shape of the air bag door portion.

4. The air bag door system according to claim 3, wherein the frangible portion is a V-shaped groove notch portion.

5. The air bag door system according to claim 1, wherein said engaging portions comprise a recessed groove portion which is formed in the flange portion of one of said first and second cover members and a projection portion which is provided in the flange portion of the other of said first and second cover members and is engaged with the recessed groove portion, and the flange portions of said first and second cover members are so connected with each other as to form the contact line by means of engagement of the projection portion into the recessed groove portion.

6. The air bag door system according to claim 5, wherein increased thickness portions are formed in an opening of the recessed groove portion, and a root portion of the projection portion is formed narrow in width corresponding to the increased thickness portions of the recessed groove portion.

7. The air bag door system according to claim 1, wherein said engaging portions comprise two recessed groove portions which are formed in the flange portion of one of said first and second cover members and two projection portions which are provided in the flange portion of the other of said first and second cover members and are engaged with the recessed groove portions, and the flange portions of said first and second cover members are so connected with each other as to form the contact line by means of engagement of the projection portions into the recessed groove portions.

8. The air bag door system according to claim 1, wherein said engaging portions comprise a first recessed groove portion and a first projection portion which are formed in the flange portion of one of said first and second cover members and a second recessed groove portion and a second projection portion which are provided in the flange portion of the other of said first and second cover members, and the flange portions of said first and second cover members are so connected with each other as to form the contact line by means of engagement of the first projection portion into the second recessed groove portion and engagement of the second projection portion into the first recessed groove portion.

9. A method for manufacturing an air bag door system including an air bag door portion releasably connected with a car inside member along a contact line thereof, the air bag door portion being covered with a cover member and the car inside member being covered with another cover member, said method comprising the steps of:

forming respectively the cover member for the air bag door portion with a flange portion provided with an engaging portion and the cover member for the car inside member with a flange portion provided with an engaging portion in such a manner that the flange portions provided with the engaging portions thereon to connect the two flange portions superimposingly are respectively bent toward back sides of the two cover members along the contact line;

setting the cover members in one mold half of a mold in a state that the cover members are connected with each other and a core member on the other mold half of the mold; and introducing reactive foam ingredients onto back surfaces of the cover members and closing the mold halves to form the air bag door portion and the car inside member releasably connected with each other.

10. The method according to claim 9, wherein the engaging portions are formed respectively by means of insert members.

* * * * *